United States Patent [19]

Stringfellow et al.

[11] Patent Number: 5,394,549

[45] Date of Patent: Feb. 28, 1995

[54] TASK SPAWNING RESPONSIVE TO RELATIONAL DATABASE CONDITIONS AND OPERATIONS

[75] Inventors: Bruce Stringfellow, Irving; Mike Mitchell, Southlake, both of Tex.

[73] Assignee: International Business Machines Corporation, Armonk, N.Y.

[21] Appl. No.: 991,894

[22] Filed: Dec. 17, 1992

[51] Int. Cl.$^6$ .............................................. G06F 9/40
[52] U.S. Cl. .................. 395/650; 364/DIG. 1; 364/261.5; 364/283.4; 364/281.3
[58] Field of Search ...................... 395/650, 600, 725; 364/DIG. 1 MS File

[56] References Cited

U.S. PATENT DOCUMENTS 4,325,120 4/1982 Colley et al. ................. 364/DIG. 1
5,305,434 4/1984 Ballard et al. .................. 395/600 X

OTHER PUBLICATIONS

IBM Technical Disclosure Bulletin; vol. 34 No. 8 Jan. 1992; p. 346; D. R. Cox et al.; "Unsolicited Notification by a Servet in MVS to a Requester in CICS".
IBM Technical Disclosure Bulletin; vol. 33 No. 11 Apr. 1991, p. 239; J. C. Dunn, et al.; "Request/Resume Commands with Intervening Gets/Sets".
IBM Tecyhnical Disclosure Bulletin; vol. 34 No. 108 Mar. 1992; pp. 220-222; D. M. Folmar, et al.; "Automatic Construction of an Engineering Change".
IBM Technical Disclosure Bulletin; vol. 34 No. 4A Sep. 1991; pp. 150-151; D. C. Jacobs, et al.; "OS/2 Database Manger Database Even Monitor".
IBM Technical Disclosure Bulletin; vol. 33 No. 10A Mar. 1991 p. 347; G. W. Bonsall, et al.; "Collection Index For Temporal Data Descriptions".
IBM Technical Disclosure Bulletin; vol. 33 No. 10A Mar. 1991, pp. 344-345; "Sequence Index For Temporal Data Descriptions".

*Primary Examiner*—Thomas M. Heckler
*Attorney, Agent, or Firm*—Whitham, Curtis, Whitham & McGinn

[57] ABSTRACT

An enhancement for a data processing system including a relational database provides storage of at least a first command corresponding to each of a plurality of tasks which can be automatically performed. In response to an event or conditions in the data processing system, such as an operation in the relational database, a task is selected and the first command and additional task lines are output. These lines are assembled with arguments derived from conditions or operations in the system such as arguments of the relational database operation. Additional events and system conditions may be imposed for task selection, imposing conditionality and chaining of plural tasks. Immediate execution of a selected task is accomplished by selectively inserting a first command of the task in exit code of another application executable on the data processing system. A parser is provided to select parameters and assemble the parameters with task lines as arguments thereof.

17 Claims, 4 Drawing Sheets

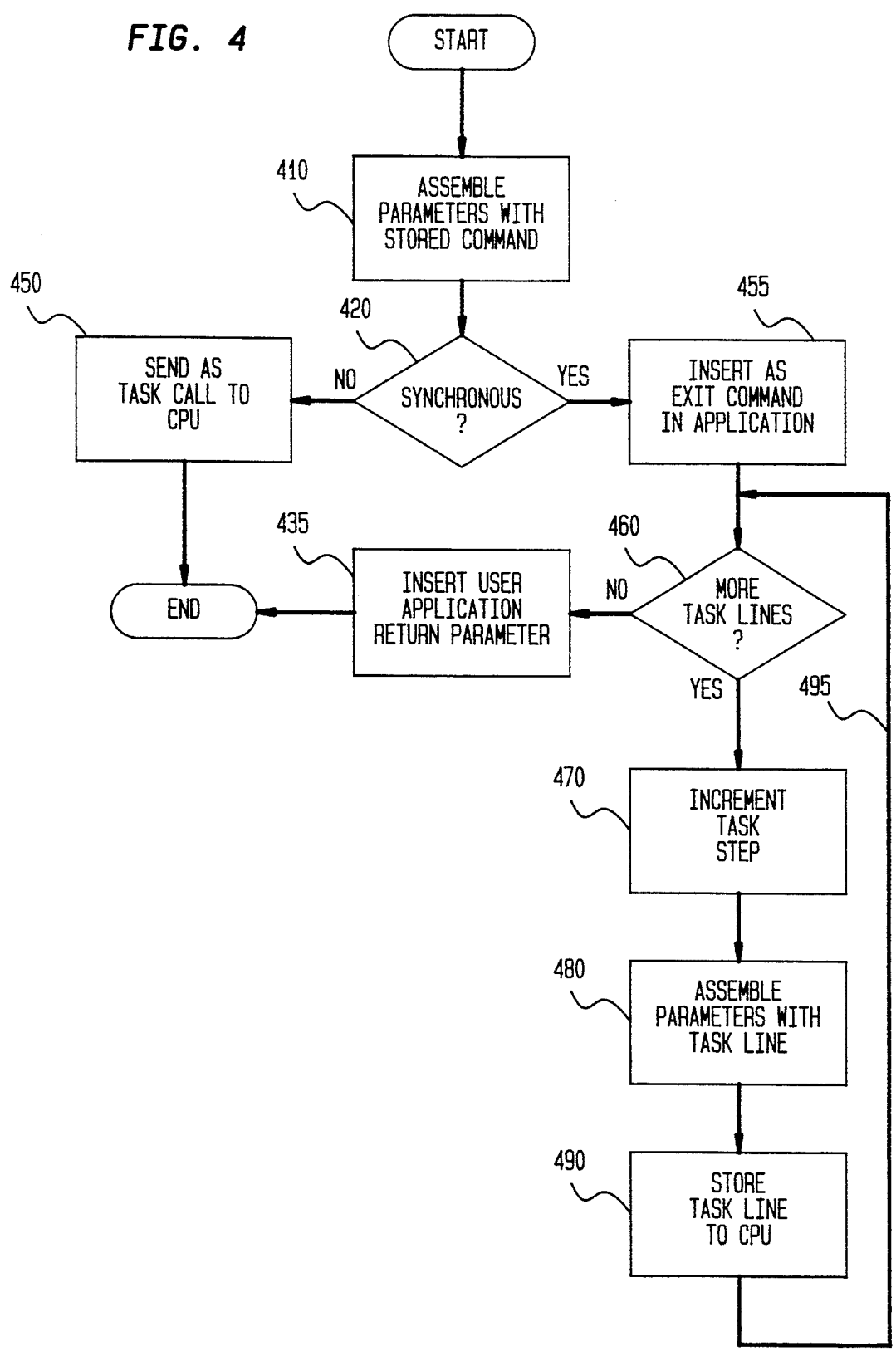

TASK SPAWNING RESPONSIVE TO RELATIONAL DATABASE CONDITIONS AND OPERATIONS

DESCRIPTION

BACKGROUND OF THE INVENTION

1. Field of the Invention

The present invention generally relates to data processing systems utilizing a relational database and, more particularly to the automatic initiation or spawning of tasks within such systems.

2. Description of the Prior Art

The basic attribute of the stored program computer is the ability, by virtue of its stored program, to execute a large and potentially complex series of operations largely independent of operator intervention. Even where the applications program, such as a word processor, is continuously interacting with the operator or user, many other groups of operations within the application, such as network control or page formatting may be performed, often with complete transparency to the user. For example, timed back-ups of documents are automatically initiated upon the lapsing of a predetermined and often user-definable period of time. While the timed back-up of a file during composition is not entirely transparent to the user due to the time required for disk access, many operations within that operation, such as the assignment of tracks and sectors of storage and linking of the addresses thereof to accommodate the file size, occur without any indication to the operator and at such high speed that the operator is not aware of them.

It is well-understood that the functioning of a computer relies on many operations which are specified in sequence and stored and which are collectively referred to as a program. Each of these operations is defined by a statement which must rigidly comply with a predetermined form. The program must similarly be invoked by a command stated in a form which is also rigidly defined. Such commands can be entered by an operator or as part of another program. In the latter case, the program invoked by a command supplied by another program is often referred to as a subroutine of that program.

Operator-generated commands may also be supplied to the computer by embedding them in other files, such as text files. For example, a predetermined combination of characters at a specific location in a document such as electronic mail (e-mail) may be sensed by a computer during recall from memory in order to generate an acknowledgement message, commonly referred to as a confirmation of delivery (COD) message. However, these commands must also be in rigidly defined form which implies that the file in which they are inserted must also be of rigidly defined form and must be accessed in a consistent manner. In networks supporting the transmission of e-mail, therefore, the storage and access protocols are supplied by articulating the storage (which may be a distributed resource) into so-called mini-disks which simulate local disk storage. The same access rules are defined for and apply to all files stored on the mini-disk.

In recent years, so-called relational databases have been developed and are in increasing use because of the flexibility which they provide. Relational databases also provide for increased access speed since groupings of items (not necessarily as "files") in accordance with user-defined "relationships" provide for a reduction of search for a document called. More specifically, a relational database provides for specification of access rules (e.g. addresses, access authorizations, data compression and conversion rules, storage format, etc.) for every item it contains. This flexibility also provides for storage of many disparate forms of information such as text files and digitized video image or audio data. Storage capacity is also increased over the system since access rules allow for the access to an item by specified users rather than requiring storage of a file in the mini-disk of each user which is to have access thereto.

However, as an incident of this flexibility provided by relational databases, there is no longer a standard form of a stored item and the embedding of commands cannot be supported. At the same time, the flexibility of relational databases allows more types of data to be stored and greater variety of application programs to interact with them. Therefore, the need for memory maintenance functions and other automatic commands for tasks which may be invoked and executed with possible transparency to the operator is increased although there is no currently available mechanism to satisfy this need.

For example, if an office system capable of supporting e-mail were to be designed using a relational database instead of mini-disks, transmitted e-mail would probably be merely added to the relational database. In a conventional e-mail system, the fact of storage on a particular mini-disk associated with a user could be sensed in order to generate a message notifying the user of the receipt of e-mail. This is possible because of the association of the mini-disk with the user and the consistent access rules for all files on a given mini-disk. It should also be noted in this regard that if the e-mail message were to be sent to a plurality of users, it would be stored a like plurality of times; one copy being stored on each desired user mini-disk, as noted above.

In contrast, a relational database would store only one copy of an item and assign access rules to provide for access only by the desired users. Because of this form of storage, there is no available mechanism for initiating even such a simple task as notifying the intended recipient that the e-mail message has arrived and is accessible to the user. Also, since the message is not accessed in a necessarily consistent manner by different users, there is no consistent source of information regarding the access to support, for example, the generation of COD messages. The only presently available solution to this problem is for the recipient to continually or periodically poll the relational database for the existence of new e-mail messages or other items to which the user may have access. Polling in this manner represents significantly large computing overhead even for a single user. Such polling requires accessing of addresses of all items of the relational database corresponding to a user which is a severe burden on the system memory controller. For large networks with many users a significant fraction of the computing power and memory access time of the system would be required, particularly if polling is performed rapidly in order to more promptly inform the user. Further, polling operations are seldom performed automatically since it is undesirable that operations requiring such computing overhead be carried out other than under the direct supervision of an operator. By the same token, such polling is operationally inconsistent with the running of other applications by the user since the application must be interrupted to inform the user of the result of the polling unless such notification is deferred, thereby negating the benefit of rapid polling. If polling is performed slowly in an effort to reduce computing overhead, the delay in notification of the user of polling results may also represent a substantial inconvenience to the user. However, the provision of slow polling as a system function would allow no flexibility to the user in regard to the speed with which polling results are provided.

SUMMARY OF THE INVENTION

It is therefore an object of the present invention to provide an arrangement for invoking or spawning of tasks in response to operations, events and/or conditions, including lapse of time, on a relational database.

In order to accomplish these and other objects of the invention, a data processing system is provided including, in combination, a relational database, an arrangement for detecting at least one of an event or a condition in said relational database, an arrangement for storing at least a first command corresponding to each of a plurality of tasks, an arrangement responsive to the detection of at least one of an event or a condition in the relational database for selecting said first command corresponding to one of said plurality of tasks, and outputting the first command to a portion of the data processing system for execution.

In accordance with another aspect of the invention, a method of automatically spawning tasks in a data processing system including a relational database is provided, including the steps of storing at least a first command corresponding to each of a plurality of tasks, sensing at least one of an event or a condition in the relational database, selecting a task in response to the event or condition, adding at least one of an argument and a return specification to the first command, and executing the first command in response to said selecting step.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a generalized flow diagram illustrating the operation of the task program storage and parser block of FIG. 1 as detailed in FIG. 3.

DETAILED DESCRIPTION OF A PREFERRED EMBODIMENT OF THE INVENTION

Figure 1:
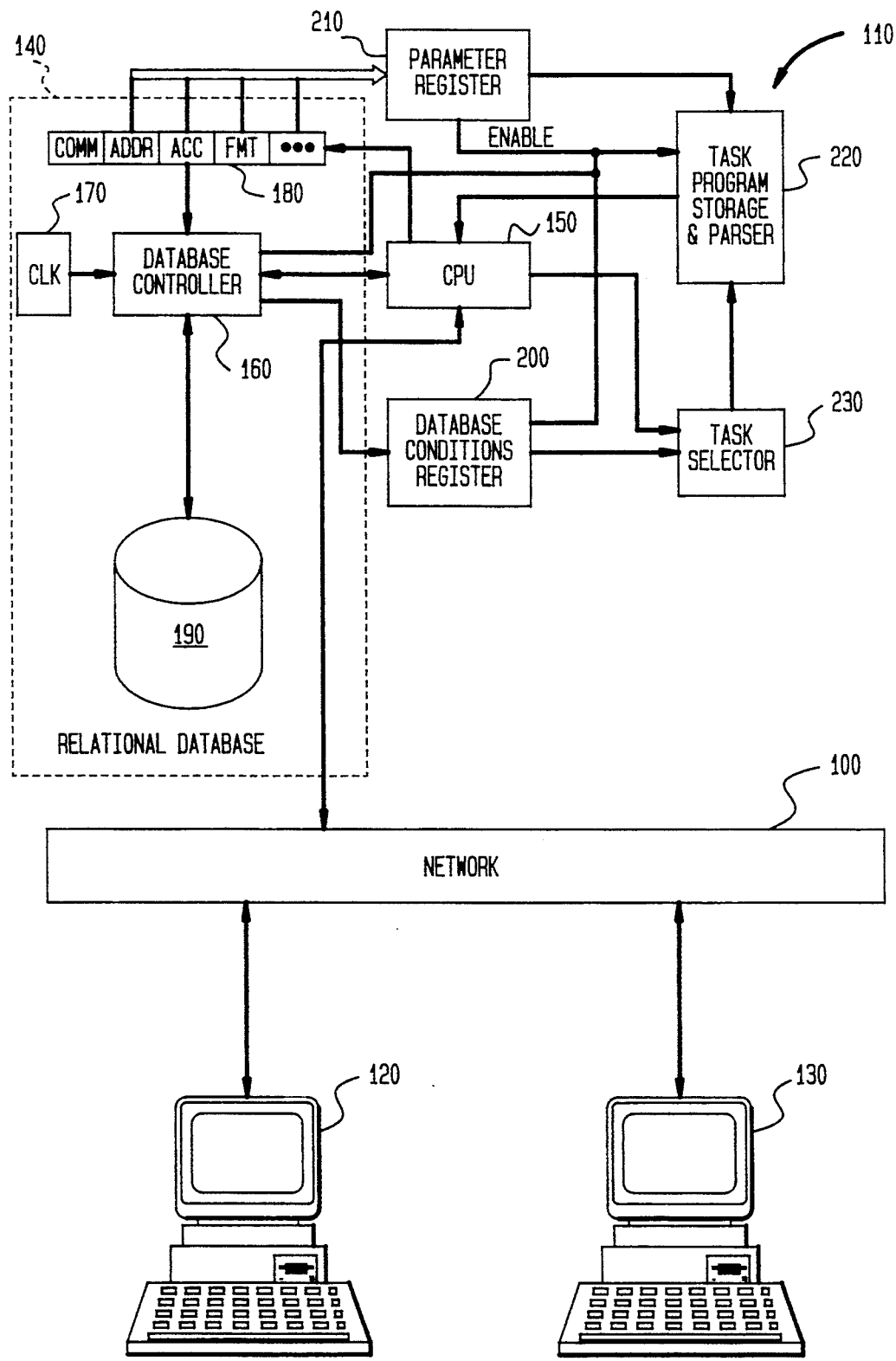
FIG. 1 is a schematic diagram of a portion of a data processing system including a relational database.

Referring now to the drawings, and more particularly to FIG. 1, there is shown, in schematic form, a data processing system which may include a network supporting communications between exemplary terminals 120 and 130. It is to be understood that an environment including a network and plural terminals is not necessary to the practice of the invention but is illustrated here and described below in regard to operation of the invention to aid in visualization of the utility of the invention and to contrast the invention with the prior art. In fact, central processing unit (CPU) 150 could simply be the CPU of a stand-alone personal computer such as may also be used for terminal 120 or 130. On the other hand, CPU 150 could be associated with any terminal of the network, as in a distributed resource architecture or a dedicated CPU for managing a node of the network or the a portion or the entirety of communication on the network.

A relational database 140 is provided in association with CPU 150 is a manner well understood in the art. Typically, the relational database will be implemented as software which is run on CPU 150 and it is to be understood that the division, in terms of system architecture, between CPU 150 and the relational database 140 may not be entirely distinct. Nevertheless, a database controller 160, clock 170, memory operation command register 180 and storage means (e.g. a hard disk or other mass storage arrangement) will exist as hardware either by dedicated hardware devices or in general purpose hardware by virtue of having been established as such by the relational database software.

The database controller 160 executes memory commands issued by CPU 150 and generates returns to the CPU regarding status or execution of those operations as well as receiving information concerning the operational conditions of store 190. Such information may include the available storage capacity, addresses and links between data, number of records or items stored and the like. The particular information returned is not particularly important to either the understanding or the practice of the invention and some information could be made user-definable in accordance with the practice of the invention. The basic concept of the invention merely requires the capacity for some information regarding the relational database operations, conditions and/or status to be returned to the database controller. This return of information need not even be provided as part of the relational database, itself.

The enhancement 110 of the relational database 140 in accordance with the invention includes a database conditions register 200, a parameter register 210, a task selector 230 and a task program storage and parser element 220. The database conditions register 200 is preferably a block of storage which receives and holds information regarding operations, conditions and status of the relational database, when such information is returned. The database conditions register 200 may also include storage for threshold conditions or other comparison logic although it will be understood by those skilled in the art and in view of this description of the invention, that it is immaterial whether these types of further functions are performed by the database conditions register 200 or implemented as a function of task selector 230. The parameter register 210 performs the same functions for arguments of database commands placed in command register 180 by CPU 150. The parameter register may be unnecessary if the information in command register 180 is not volatile when the command is initiated or executed. The task selector 230 compares data output by the database conditions register 200 and outputs a signal for calling a particular task and/or operations from the task program storage and parser element 220 in response to one or a combination of plural conditions of the relational database 140. Response of the task program storage and parser element 220 to task selector 230 is enabled by selected (e.g. predetermined coincidences of) outputs of at least one of the parameter register 210, database controller 160 and database conditions register 200. These selection coincidences are preferably user definable and details thereof are not critical to the practice of the invention. For example, response may be enabled by the parameter register 210 whenever command parameters are detected in command register 180 in order to enable the selection of one or more of a plurality of tasks whenever an operation of the relational database is called but before execution thereof. Similarly, execution of a command by database controller 160 could be used to enable selection of one or more of another plurality of tasks. Also, the invention could be operated in a condition-driven manner rather than an event-driven manner by periodic testing of conditions in the database conditions register.

It will also be understood by those skilled in the art and in view of the present description of the invention that the particular mode of enablement of the task program storage and parser element is relatively unimportant to the practice of the invention and could be done in many different ways. For example, if the task to be spawned was a "housekeeping" operation in the relational database, say, for data resegmenting and/or compaction, the task could be initiated through the database controller 160 (e.g. as an "event"). Alternatively, conditions of the relational database which indicate the desirability of such an operation could be reported to database conditions register 200 (e.g. as a "condition") and thus combined with other conditions and/or thresholded for initiation and selection of one or more tasks.

Figure 2:
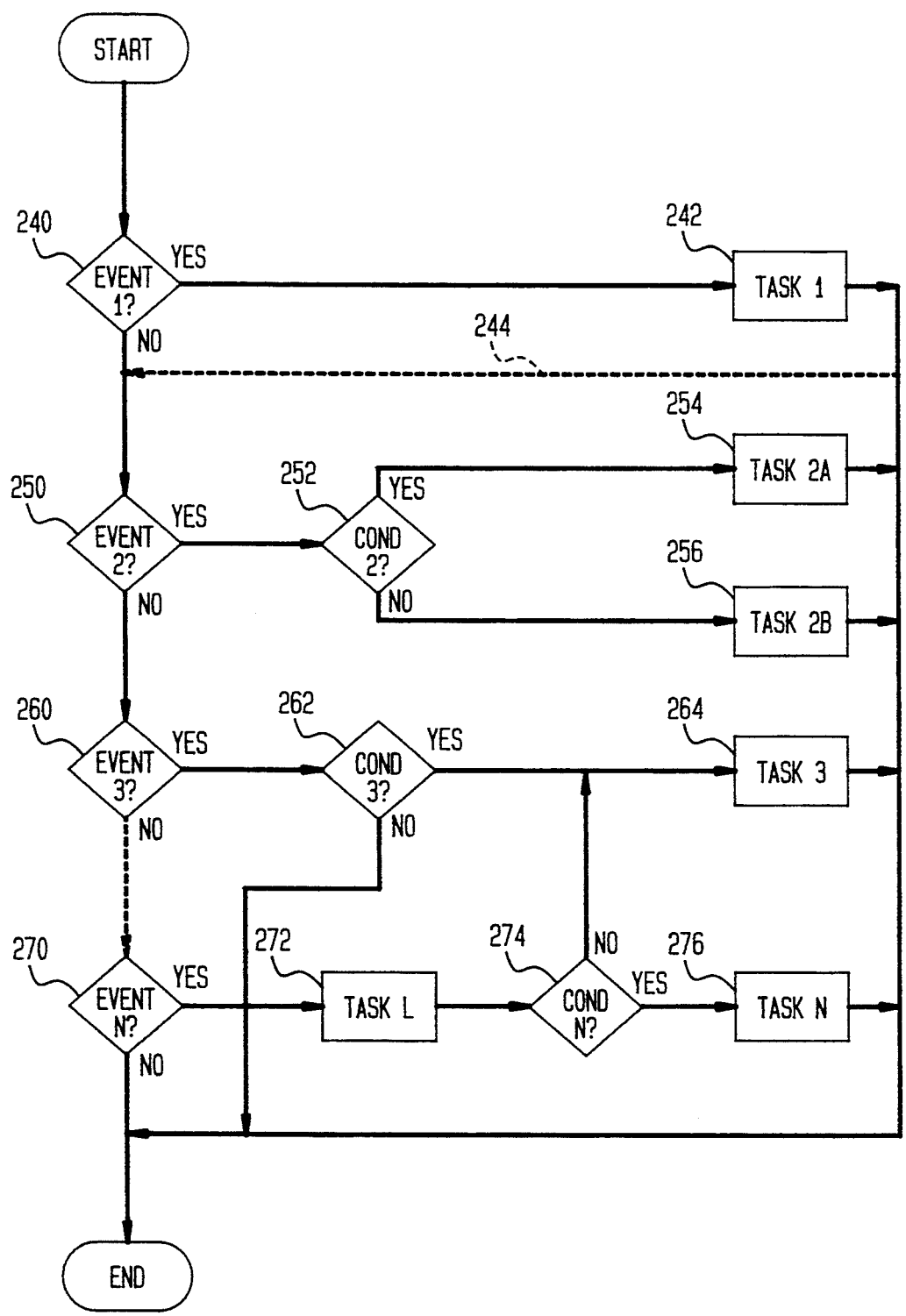
FIG. 2 is a generalized flow diagram in accordance with the invention.

Referring now to FIG. 2, the operation of task selector 230 will now be explained. Task selector 230 is preferably implemented as software for ease of initial definition and user definition and modification of condition which will evoke responses. However, the task selector could readily be implemented in hardware by a suitable interconnection of devices which could function as data comparators. A programmable read only memory (PROM), addressable by digital values of conditions, is a preferred structure for such a hardware implementation.

For simplicity, it will be assumed that the system is event-driven that the process of FIG. 2 has been initiated. Of course, as pointed out above, the process could be condition-driven by testing conditions rather than events at branching operations 240–270 or a combination of events and conditions tested in the same way.

Once the process is entered, any number of events or conditions could be tested, in sequence by branching operations 240, 250, 260, 270. If one of these conditions or events is satisfied, for example, a store operation to the relational database, branching occurs to spawn a task, the task is performed and the process ends. Any other condition or event which may exist will be detected and a corresponding task spawned when the process of FIG. 2 is again started. Alternatively, any or all tasks may include an exit statement to cause return to the next branching operation in the sequence in order to immediately spawn other tasks which would be generated in response to events and conditions which may also be met. This alternative would be preferred for task programming simplicity but it should be recognized that numerous operations (including what might be referred to as "sub-tasks") can be included within a particular task to be spawned. It is contemplated at the present time that a one-to-one correspondence between tasks to be spawned and conditions upon which task spawning will be done will predominate (at least as an organizational condition since a particular task could be spawned in response to several events or conditions or combinations thereof) and terminating the process upon completion of the task will be appropriate in the great majority of cases.

Some exemplary operations of the task selector will now be discussed to enhance an understanding of the flexibility of task selector 230. If the process of FIG. 2 is started and branching occurs at 240, task 1 (242) is unconditionally performed. This type of operation would be appropriate for e-mail addressee notification. If branching occurred at 250, conditions or events could be further tested at 252 to allow selection between task 2A (254) and task 2B (256). This selection is not limited to two tasks but could be expanded at will by sensing of further conditions in a "decision tree" of branching operations. Similarly, if branching were to occur at 260, a condition or event could be tested at 262 with spawning of task 3 at 264 if met or branching to the end or elsewhere in the process if not met. This type of condition testing would be appropriate for selective generation of acknowledgement messages if desired by the sender of an e-mail message.

As indicated above, tasks can also be chained or even conditionally chained. For example, if branching were to occur at 270, task L (272) would be unconditionally performed (although conditions could be imposed, as desired) and then selecting between task 3 and task N (or branching to any other point in the process or the end) based on the testing of another event or condition at 274. Therefore, it is seen that complete flexibility of selectivity of tasks is provided by task selector 230 since any particular task (e.g. task 1) can be specified as task L or task N or any other task. In other words the same task may be spawned based on any number of events or conditions or groups thereof.

Figure 3:
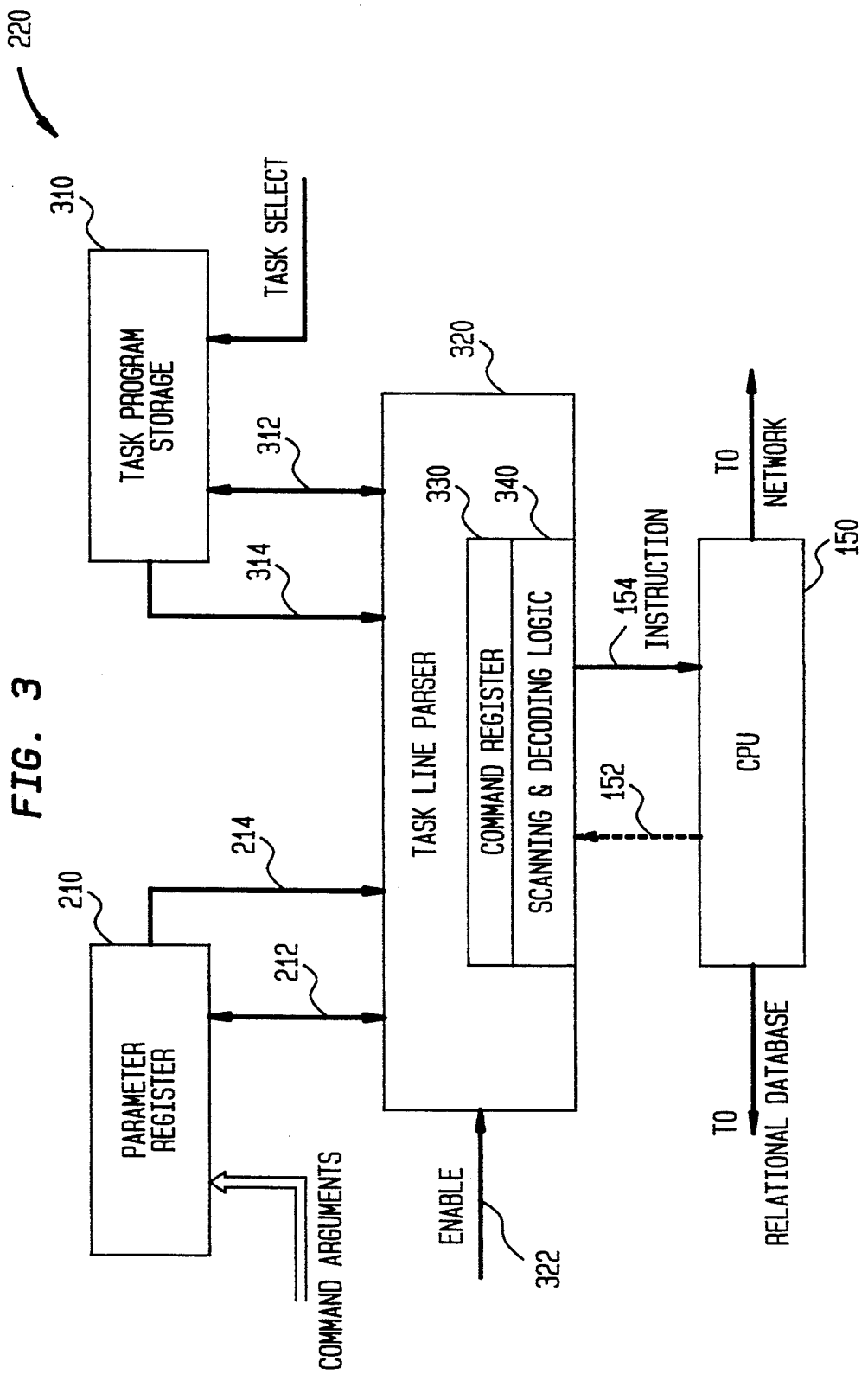
FIG. 3 is a schematic block diagram of an implementation of the task program storage and parser block of FIG. 1.

Referring now to FIG. 3, the architecture of the task program storage and parser element 220 will be discussed. Upon enablement of the task program storage and parser element 220 by parameter register 210, database controller 160 or database conditions register 200, as discussed above, program steps of the selected task will be retrieved from memory 310, passed through task line parser 320 for insertion or attachment of arguments derived from parameter register 210 and stored as instructions to be called from the random access memory (RAM) of the CPU 150. More specifically, when an enable signal is received at 322, an interrupt may be generated for the CPU depending on whether the task to be spawned is to execute in a synchronous or asynchronous fashion. Clock cycle signals are received from the CPU over connection 152 or generated internally in the parser. The signal at 152 may also be only provided by the CPU when it is able to receive instructions from the task line parser 320 and to synchronize transfer of those instructions. In either case, transfer of task lines from storage is also synchronized over connection 312. Transfer of parameters from parameter register 210 is similarly synchronized over connection 212.

Task line parser 320 is principally a random access register preferably capable of containing one instruction line of maximum instruction length, a scanning arrangement for scanning through stages within the register and a decoding logic arrangement for recognizing locations at which substitution or additions to information in the register should be made and to assure the construction of an instruction in the closely defined format required for each command which may be included in the task. Parsers are themselves well known and the specifics thereof are not critical to the practice of the invention. The elements of the parser mentioned in this discussion are also not critical or necessarily preferred but are discussed in a manner which will promote understanding of the invention. Essentially, once a line of a task is loaded into register 330, the scanning and decoding logic 340 scans forward and backward through the command register 330 in order to recognize the command, determine the locations where arguments are to be inserted, determine the identity of the arguments and to perform the insertion or addition. In this manner, the arguments are effectively selected in response to the events or conditions which cause spawning of a particular task. Particular parameters are called over connection 212 and returned over connection 214. Additional information or return identifying the parameter may also be communicated over connection 212. (For this reason, connection 212 is indicated as bi-directional since access and selection in regard to parameters is essentially random in order whereas task lines are retrieved in a predetermined sequence and only uni-directional calls or synchronization signals need be provided over connection 312 with uni-directional returns made over connection 314.) Providing for selection and identification of parameters over bi-directional communication over connection 212 thus allows flexibility with regard to the parameters selected and parsed with the command. For example, a user accessing an item in the relational database on the basis of user identification would provide the corresponding user identification code in a particular portion of the database access command and which would then serve as the return address for the item accessed (even though not necessarily separately present in the command). In contrast, for a user with wide access authorization, a different access command would be likely to be used and the user identification information might only be available from the return address in the database command. The parser thus obtains selective access to parameters in the parameter register 210 (or arguments in command register 180) to reconcile differences in modes of access to items in the relational database in regard to a particular task which is spawned in response to either mode of access.

When operation of the parser on a given line of the task program is complete, the task line is transferred from command register 330 to CPU 150 over connection 154. CPU 150 may begin executing the task immediately or may wait until the entire task program has been transferred as will be discussed below in regard to other perfecting features of the invention, with reference to FIG. 4.

In the practice of the invention, it is deemed desirable to enable the user to specify whether the task is to run with full transparency in the processor background or whether an interrupt is to be generated for any application currently running. Since the generation of an interrupt synchronizes the task and the application (e.g. the application is halted until execution of the task is completed), these modes will be referred to hereinafter as asynchronous and synchronous, respectively. This determination of mode is user-definable by the return parameter specified for the task. More specifically, when events or conditions indicate a task or group of tasks is to be spawned (conditionally or unconditionally), a first line of the task is fetched from task program storage 310 to task line parser 320 where arguments are added in correspondence with parameters of a memory operation command, if necessary. This first line of the task will be initially defined and stored in task program storage 310 with a return parameter which, if the return parameter is a user application, will generate an interrupt of that application. Otherwise, if, say, a user notify return is specified (although no return is theoretically necessary for asynchronous task execution), a display notifying the user of execution of the task (e.g. a COD of an e-mail message) will be displayed at the next interrupt, pause or wait state of the application.

It should be noted at this point that the entire task need not be specified or stored in the task program store. In fact, it is contemplated that most tasks will be other applications such as note generation and memory housekeeping routines which are otherwise available on the system. Therefore, each such task which is otherwise available will merely have a single line specified in the task program store. Further, this line of the task need not be a command calling for the task to be executed but in some cases may also be a command for inserting the task or application call within an exit statement in the operation or routine which triggers the task. In this way, the spawned task may be concatenated with or appended to an operation which is concurrently being executed. This variation of the invention allows the spawned task to be run immediately and unconditionally. Otherwise, the task will be run when the CPU reaches the call for the task, The task may also include one or more imbedded pauses allowing for operator intervention and/or choice between options. These options may also include whether to switch the synchronous/asynchronous modes and the "execute immediate" variation.

Referring now in more detail to FIG. 4, when a task has been selected and the task line parser 320 enabled, the first line of the selected task is retrieved from storage and assembled with parameters, if necessary, as shown at 410. Then, at branching operation 420, it is determined if the task mode is to be synchronous or asynchronous. This illustration is intended to be generic to both operator intervention at this point if a return is not specified in the command and the case where the task is an otherwise available application for which a return may be specified or where the return is defined in the first line of the task in the task program store (e.g. a one line task specification of an available application to be run as a spawned task).

If the task is to be run in a synchronous mode, it is assumed that immediate and unconditional execution of the task is desired (since synchronous mode, by definition, interrupts any application currently running) and the command is inserted (455) in exit code of the application which caused the task to be spawned. Otherwise, the command is sent as a task call to the CPU at step 450 and the process ends. If the task to be run asynchronously requires multiple lines, the additional lines can be provided as a subsequent or nested task to be run in a synchronous mode under the command. The interrupt which will be caused by the user application return parameter inserted at 435 will then be irrelevant since interruption of the execution of the command, which is then the user application, simply corresponds to the running of the additional lines of the desired task. Therefore, each task requiring more than a single line command will eventually cause branching to 455, after which, if it is determined that more lines are present at branching operation 460, will cause the task step to be incremented at 470. If necessary parameters are assembled with the task line by parser 320 at step 480 and the task line is stored to the CPU. The process then loops through 495 until all steps of the task have been parsed and stored for execution. Then a user application return parameter is inserted at step 435 for generation of an interrupt of the user application and the process ends as the spawned task is executed.

In view of the foregoing, it is seen that the invention provides for spawning of tasks in response to predetermined events or conditions even when task spawning is not otherwise supported by a portion of the system architecture such as a relational database. It should therefore be understood that the present invention is applicable to any data processing system whether or not a relational database is employed. However, in a data processing system environment which includes a relational database, the invention is capable of providing for the automatic spawning of arbitrary tasks which is not otherwise supported due to the architecture of the relational database. The invention, by providing for the testing of events and conditions, particularly in the relational database, and providing a source of parameters to be assembled and parsed with task lines is thus able to spawn arbitrary tasks based on any conditions or events in the data processing system and thus forms an excellent vehicle for adding such tasks to any application or group of applications simultaneously regardless of system hardware or architecture.

While the invention has been described in terms of a single preferred embodiment, those skilled in the art will recognize that the invention can be practiced with modification within the spirit and scope of the appended claims.

What is claimed is:

1. A data processing system including, in combination,
   a relational database,
   means for detecting at least one of an in said relational database or a condition in said relational database,
   means for storing at least a first command corresponding to each of a plurality of tasks,
   means responsive to said means for detecting at least one of an event or a condition in said relational database for selecting said first command corresponding to one of said plurality of tasks, and
   means for outputting said first command to a portion of said data processing system for execution of said first command.

2. A data processing system as recited in claim 1, further including
   means for assembling a parameter with said first command as an argument of said first command.

3. A data processing system as recited in claim 2, further including means for deriving said parameter from arguments of another command in said data processing system.

4. A data processing system as recited in claim 2, further including means for storing said first command to be executed by a processor in said data processing system.

5. A data processing system as recited in claim 2, further including means for storing said first command in exit code for an operation executable on at least a portion of said data processing system.

6. A data processing system as recited in claim 2, wherein said first command specifies a return to a user application.

7. A data processing system as recited in claim 2, further including
   means for retrieving additional lines of code from said means for storing at least a first command corresponding to each of a plurality of tasks, said additional lines corresponding to a task selected by said means for selecting said first command corresponding to one of said plurality of tasks.

8. A data processing system as recited in claim 2, wherein said means for selecting said first command corresponding to one of said plurality of tasks further includes
   means for selecting said first command in response to at least one further event or further condition in addition to said at least one event or condition.

9. A data processing system as recited in claim 1, further including means for storing said first command to be executed by a processor in said data processing system.

10. A data processing system as recited in claim 1, further including means for storing said first command in exit code for an operation executable on at least a portion of said data processing system.

11. A data processing system as recited in claim 1, wherein said first command specifies a return to a user application.

12. A data processing system as recited in claim 1, further including
    means for retrieving additional lines of code from said means for storing at least a first command corresponding to each of a plurality of tasks, said additional lines corresponding to a task selected by said means for selecting said first command corresponding to one of said plurality of tasks.

13. A data processing system as recited in claim 1, wherein said means for selecting said first command corresponding to one of said plurality of tasks further includes
    means for selecting said first command in response to at least one further event or further condition in addition to said at least one event or condition.

14. A method of automatically spawning tasks in a data processing system including a relational database, said method including the steps of
    storing at least a first command corresponding to each of a plurality of tasks,
    sensing at least one of an event or a condition in said relational database,
    selecting a task in response to said at least one event or condition,
    adding at least one of an argument and a return specification to said first command, and
    executing said at least first command in response to said selecting step.

15. A method as recited in claim 14, including the further step of
    selecting said argument in response to at least one of and event and a condition in said data processing system.

16. A method as recited in claim 14, including the further step of inserting said first command in another operation executable by said data processing system as exit code thereof.

17. A method as recited in claim 14, including the further step of extracting said argument from an operation to be performed on said relational database.

* * * * *